United States Patent [19]

Butterworth

[11] Patent Number: 5,010,241

[45] Date of Patent: Apr. 23, 1991

[54] SENSOR ARRAY AND ILLUMINATION SYSTEM FOR A LARGE DEPTH-OF-FIELD BAR CODE SCANNER

[75] Inventor: Mark M. Butterworth, Santa Clara, Calif.

[73] Assignee: Hewlett-Packard Company, Palo Alto, Calif.

[21] Appl. No.: 296,997

[22] Filed: Jan. 12, 1989

[51] Int. Cl.⁵ .......................... G06K 7/10; G06K 7/14
[52] U.S. Cl. .................................. 235/462; 235/454; 235/472; 250/566; 250/568
[58] Field of Search ............... 235/454, 462, 463, 472; 250/566, 568-570, 572

[56] References Cited

U.S. PATENT DOCUMENTS

| | | | |
|---|---|---|---|
| 4,011,435 | 3/1977 | Phelps et al. | 235/454 |
| 4,210,802 | 7/1980 | Sakai | 235/472 X |
| 4,453,083 | 6/1984 | Böhlander et al. | 250/577 X |
| 4,634,880 | 1/1987 | Lindow et al. | 250/566 |
| 4,818,886 | 4/1989 | Drucker | 235/462 X |
| 4,825,057 | 4/1989 | Swartz et al. | 235/462 X |
| 4,825,091 | 4/1989 | Breyer et al. | 250/560 |
| 4,831,275 | 5/1989 | Drucker | 235/462 X |

Primary Examiner—Stuart S. Levy
Assistant Examiner—Steven M. duBois

[57] ABSTRACT

An improved sensor array and illumination scheme for a bar code scanner use a modified Scheimpflug arrangement optical system that simplifies signal processing. The preferred embodiment includes a detector array comprising a multi-element array of photosensors positioned in one Scheimpflug plane and an illumination beam in the form of a sheet of light along the other Scheimpflug plane. The detector array has a plurality of elements having a long axis and a short axis, with the long axis of the elements arranged substantially perpendicular to the image of the illuminated strip of the bar code tag. The projection of the long axis of the elements of the array onto the other Scheimpflug plane defines the working range of the optical system. So long as the bar code tag intersects the illumination beam within the working range, the image of the illuminated strip of the bar code tag will be substantially in focus across the elements of the detector array. Filtering allows substantially only the light from the illuminated strip to reach the detector array. Thus, substantially all of the light that reaches the detector array is useful signal, and all the output data from the array during a bar code scan is relevant. The output signal from the array can be processed with conventional digitizing and decoding circuitry with audio signal processing techniques.

42 Claims, 3 Drawing Sheets

SENSOR ARRAY AND ILLUMINATION SYSTEM FOR A LARGE DEPTH-OF-FIELD BAR CODE SCANNER

BACKGROUND AND SUMMARY OF THE INVENTION

The invention relates to an optical system for a bar code reader, and in particular to an improved sensor array and illumination method adapted for use with a bar code reader optical system using a modified Scheimpflug arrangement.

The optical system of a bar code scanner comprises apparatus for illuminating the bar code tag and apparatus for detecting the reflected light from the bar code tag. An optical system images the light reflected from the bar code tag onto a detector which produces an electronic signal that represents the light and dark areas of the bar code.

An ideal bar code scanner would have a large working range, while being capable of reading bar codes with very narrow bars and spaces. However, the optical requirements for these two goals conflict. Maximizing the working range requires a small lens aperture (a large f/#), while maximizing resolution requires a large lens aperture because of diffraction effects.

One type of scanner optical system, referred to as a "detector resolved" optical system, forms an image of the bar code tag on the detector, which produces an electrical signal corresponding to the dark and light pattern of the bars and spaces in the bar code. The operation of this type of scanner is limited by the ability of its detector to resolve the optical image of the bar code into an electronic signal.

The detector may be a single element photodetector, or a multiple element photodetector array that spans the image of the bar code. In a single element system, an optical scanning mechanism, such as a rotating mirror, sweeps the image of the bar code across the detector element to produce the signal. This sweep produces a serial image of a "scan line", a line through the bar code perpendicular to the bars and spaces. In a multiple element system, the detector array is electronically scanned.

The working range of a typical detector resolved optical system is the range of distance from the lens over which the image of the bar code tag remains sufficiently focused for the detector array and processing electronics to recognize bars from spaces and to measure the widths of the bars and spaces accurately. The working range is a function of the aperture of the lens system (the f/#) and the resolution of the bar code being read.

One proposal to overcome many of the problems of conventional detector resolved optical systems is described in a copending application OPTICAL SYSTEM FOR A LARGE DEPTH-OF FIELD BAR CODE SCANNER, assigned in common with this application. The desired working range is imaged onto the detector array using a modified Scheimpflug arrangement, with the array tilted with respect to the optical axis of the lens. Thus, the working range is not determined by the lens aperture, but by the dimension and orientation of the detector array. The lens aperture can be as large as desired to maximize resolution and minimize illumination needs, and thus power consumption, without adversely affecting the working range. For a high resolution bar code tag, the practical working range is about 12.5 cm to 50 cm. This is about twice as large as the working range of the best scanners with conventional optical systems.

In one embodiment, a two dimensional grid detector array is imaged over the working range in one dimension and over the width of the bar code tag in the other dimension. The array is similar to the kind of arrays used in video applications, having a large number of pixels in both dimensions. The data output rate is about 4,000,000 pixels per second, with most of the data discarded. Video signal processing techniques are used to reconstruct the in-focus image of a section of the bar code, and to produce a suitable output signal.

The object of the present invention is to provide an improved sensor array and illumination scheme for a bar code scanner using a modified Scheimpflug arrangement optical system that has simplified signal processing.

This and other advantages are realized by the preferred embodiment of the invention which includes a photodetector comprising a multi-element array of photosensors positioned in one Scheimpflug plane and an illumination beam in the form of a sheet of light along the other Scheimpflug plane. The elements of the detector array have a long axis and a short axis, with the long axis of the elements arranged substantially perpendicular to the image of the illuminated strip of the bar code tag. The projection of the long axis of the elements of the array onto the other Scheimpflug plane defines the working range of the optical system. So long as the bar code tag intersects the illumination beam within the working range, the image of the illuminated strip of the bar code tag will be substantially in focus across the elements of the detector array. Filtering allows substantially only the light from the illuminated strip to reach the detector array. The output signal from the array can be processed with conventional digitizing and decoding circuitry with audio signal processing techniques.

Figure 1:
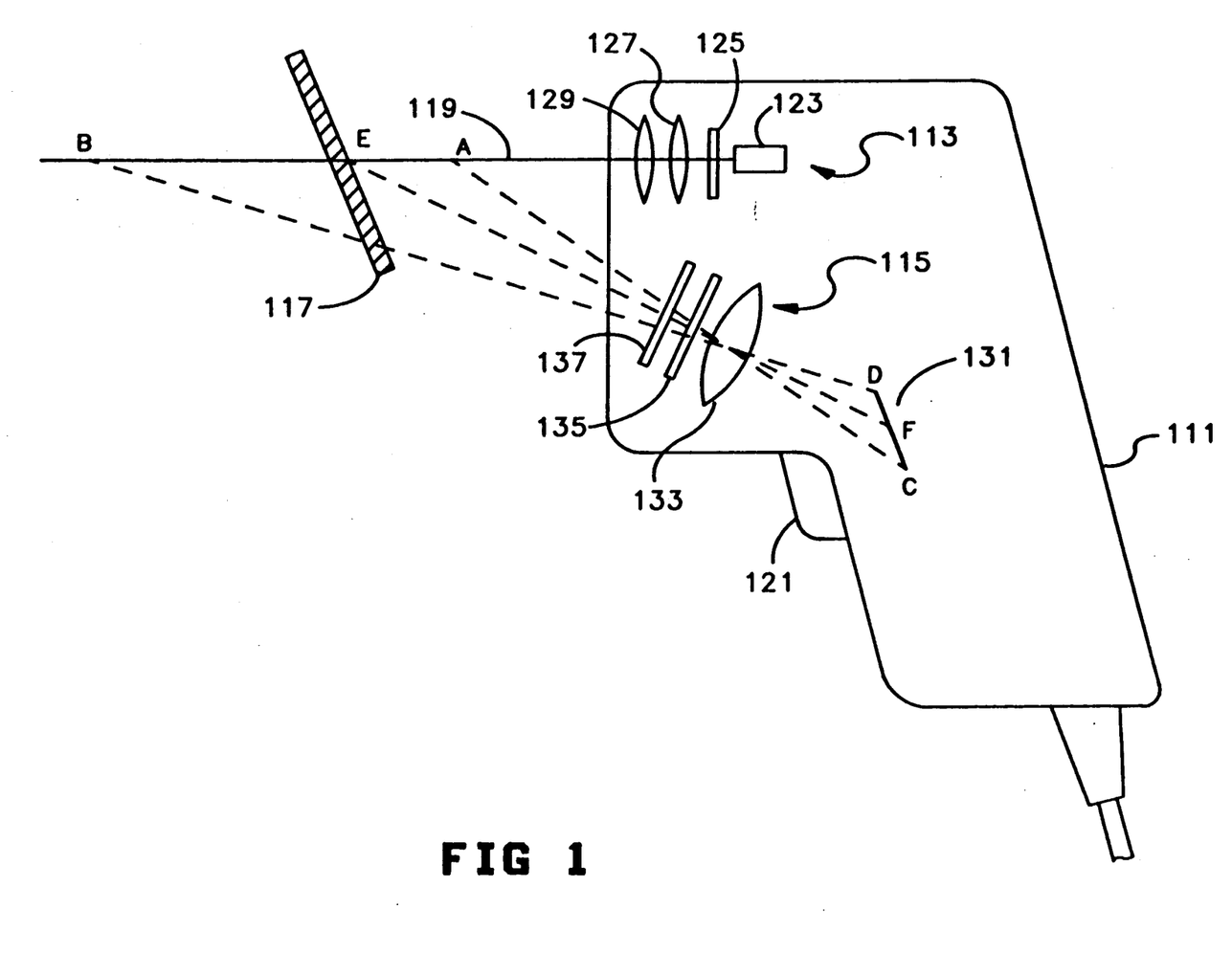
FIG. 1 is a schematic diagram showing the configuration of an optical system for a bar code scanner constructed according to the teachings of the invention.

An important aspect of the invention is that substantially all of the light that reaches the detector array is useful signal, and all the output data from the array during a bar code scan is relevant. The cooperation of the illumination system, the Scheimpflug optics and the bandpass filter makes this possible. Referring to FIG. 1, the sheet of light from the illumination section 113 illuminates only a thin strip across the bar code tag. The modified Scheimpflug optical arrangement guarantees that this illuminated strip will form a focused image on the detector array 131. The bandpass filter 137 rejects substantially all other light. As a result, substantially all of the light that reaches the detector array 131 is useful signal.

The elements of detector array 131 are constructed to take advantage of this. The detector array of the present invention has significantly fewer elements than a two dimensional grid type array. This makes the array less expensive to build and results in lower power consumption.

The detector array also has several advantages from the signal processing point of view. All the output data from the array during a bar code scan is relevant, in contrast to the output data from a grid type array in which the data from the few lines of elements that receive a focused image must be selected from the data stream. The array data output rate is about 40,000 pixels per second to produce a scanning rate equivalent to that of bar code scanners currently available. This rate is 100

DETAILED DESCRIPTION OF THE INVENTION

FIG. 1 is a schematic diagram showing the configuration of an optical system for a bar code scanner constructed according to the teachings of the invention.

The components of the optical system are mounted in a case 111 shaped so that it can be conveniently hand held and aimed at the bar code tag to be read. The optical system comprises an illumination section 113 and an imaging section 115.

The illumination section 113 produces a sheet of light for illuminating a bar code tag located on an object 117. The centerline of illumination beam 119, which is also the aiming line for the scanner, is substantially parallel to the top of the case 111. This makes it easier for the operator to aim the hand held scanner. The user aims the scanner at the bar code tag, then presses the trigger switch 121 to activate the scanner. The user adjusts his aim so the sheet of light forms a line through the bar code tag, and the scanner reads the bar code tag and transmits the output data.

The illumination section 113 comprises a light source 123, a polarizing filter 125, a collimation lens 127 and a cylindrical lens 129. Light source 123 is preferably a laser diode or an LED, emitting light at visible or infrared frequencies. Any light source may be used, although a laser has advantages. Laser light is easier to work with because the illumination sheet will not diverge as quickly, so the light and dark areas will be better defined, resulting in a better signal to noise ratio at the detector. The narrow emission frequency spectrum of laser diodes and LEDs is also beneficial for optically filtering the reflected signal from the bar code tag, as explained below.

The beam from light source 123 passes though polarizing filter 125 which linearly polarizes the light. The beam then passes through collimating lens 127 and cylindrical lens 129 to spread the illumination beam 119 into a thin sheet. The light is collimated in the Y-axis (the vertical axis in the plane of the drawing) and spread in the X-axis (perpendicular to the plane of the drawing). The spreading is done by cylindrical lens 129. Alternatively, a rotating or scanning mirror could be used to spread the beam, but a lens system is simpler and has no moving parts. When the sheet of light is directed at a bar code tag on an object 117, it illuminates a strip through the bar code tag on object 117, at the intersection of the sheet of light and the object's surface. Light from the illuminated strip is reflected to the imaging section 115 of the optical system.

The imaging section comprises a detector array 131, an imaging lens 133, a polarizing filter 135 and a bandpass filter 137. Light reflected from the bar code tag enters the imaging section optics. Bandpass filter 137 attenuates all frequencies of light except that of the illumination beam 119 from light source 123. Thus, the only image that will reach the detector array is the strip illuminated by the sheet of light from light source 123. The polarizing filter 135 is turned 90 degrees from the direction of the polarizing filter 125 in the illumination section. This blocks specular reflections from the object 117 and passes only diffuse reflections, allowing the system to ignore reflections from shiny objects that can interfere with the signal. The lens 133 collects the light and forms an image on detector array 131.

An alternative method of reducing transmission of light from specular reflections is to use circularly polarized filters of the same circular polarization in the illumination section and in the imaging section. A specular reflection reverses the circular polarization of the light, so light from specular reflections is blocked by the filter in the imaging section. Light from diffuse reflection has random polarization, so some of the light from diffuse reflections will be transmitted.

Because of the nature of the bar code pattern, it is not necessary to image the entire vertical extent of the bar code elements in order to read the bar code. Instead, it is only necessary to image one segment across the bars and spaces to read the bar code. The optical system of the invention takes advantage of this, in combination with the optical properties of the modified Scheimpflug optical arrangement.

Only the relevant portion of the reflected bar code tag reaches the detector array. The cooperation of the illumination system, the Scheimpflug optics and the bandpass filter makes this possible. The sheet of light from the illumination section 113 illuminates only a thin strip across the bar code tag. The modified Scheimpflug optical arrangement guarantees that this illuminated strip will form a focused image on the detector array 131.

The bandpass filter 137 rejects light from sources other than light source 123, including most ambient light. Thus, the only light transmitted by the bandpass filter 137 to the detector array 131 is the light reflected from the strip on the bar code tag illuminated by the sheet of light from the illumination section 113. The rest of detector array 131 will be substantially dark. As a result, substantially all of the light that reaches the detector array 131 is a focused image of a strip through the bar code tag, with little or no processing required to produce a useful output signal from the detector array 131.

As described in more detail below, the detector array 131 is located in a Scheimpflug plane with respect to the imaging lens 133 and the plane of illumination beam 119. With this arrangement, the illuminated strip through the bar code on the object will be imaged on the detector array if the object is between point A and point B in the plane of illumination beam 119. The distance from point A to point B defines the working range of the bar code scanner, and the effective depth of field of the optical system.

Figure 2:
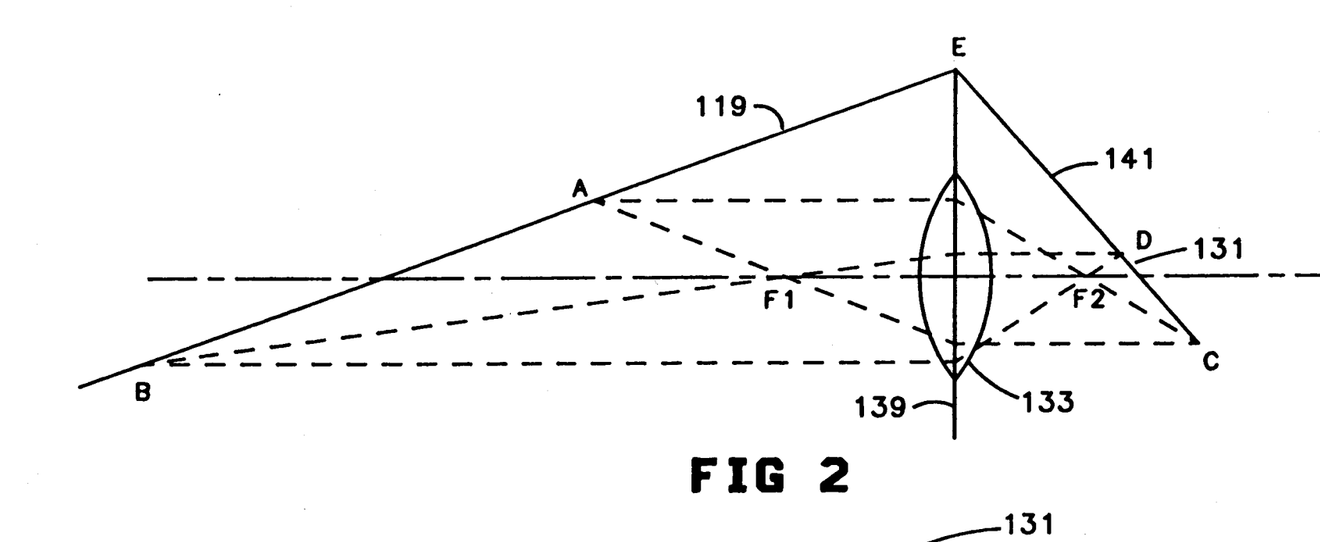
FIG. 2 is a two dimensional diagram illustrating the optical principle of the modified Scheimpflug arrangement optical system used in the invention.

FIG. 2 is a two dimensional diagram illustrating the optical principal of the modified Scheimpflug arrangement optical system used in the invention. The lens 133 forms an image on the detector array 131. The principal plane 139 of the lens 133, the plane 141 of the detector array 131, and the plane of illumination beam 119 intersect at line E, and thus are arranged in what is known as the Scheimpflug condition.

Lens 133 has a front focal point F1 and a rear focal point F2. Rays from the detector array 131 parallel to the optical axis 141 of lens 133 are focused through point F1. Rays from the object parallel to the optical axis 141 are focused through point F2. Points A and B in the plane of illumination beam 119 are imaged onto points C and D respectively on the detector array. All points along the line AB are imaged to points along the line CD. Conversely, the projection of the detector array 131 onto the plane of illumination beam 119 defines the working range AB.

Referring again to the two dimensional cross-sectional view of FIG. 1, for any object 117 located in the working range, i.e., along the line AB, there will be a point E that is illuminated by the illumination beam 119 from illumination section 113. Since the illumination section 113 produces a sheet (plane) along the Scheimpflug object plane, point E will always be on the object plane. Therefore, point E will be imaged, in focus, onto the detector array 131 (in the Scheimpflug image plane) at point F. In general, the illuminated points on an object between points A and B will be imaged in focus somewhere on the detector array 131. Thus, the dimension of the detector array 131, the position of the detector array in the image plane, the angle between the plane of the detector array 131 and the plane of the lens 133, and the focal length of the lens 133, determine the working range of the scanner.

Figure 3A:
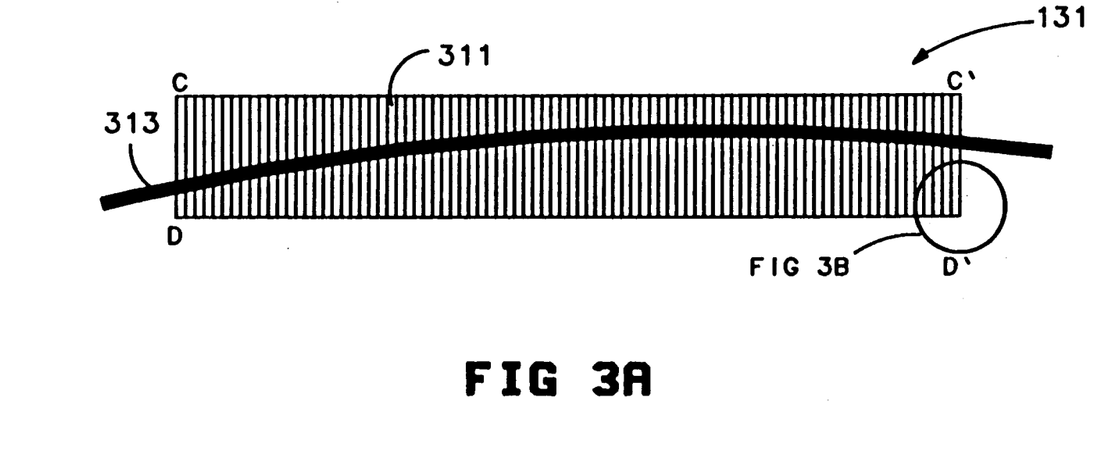
FIGS. 3A and 3B show more detailed views of the detector array shown in FIGS. 1 and 2.
Figure 3B:
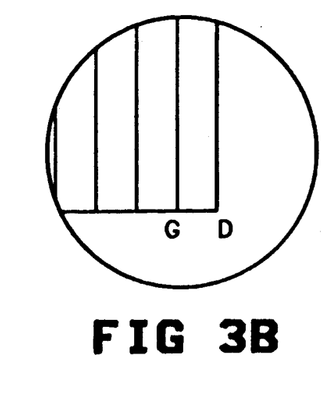

The detector array 131 comprises a multi-element array of individual photosensors. FIGS. 3A and 3B show a schematic view of the detector array. The number of elements 311 in the detector array is variable. A typical system may have 1000 elements.

The detector array can be implemented using a variety of photo diode fabrication technologies, such as MOS or CCD image sensors, or as a silicon photodiode array. The resolution of the system is determined by the width of the array elements 311 and the magnification of the optical system. For a given magnification, narrower array elements provide better resolution. An array with a larger number of narrow elements would be desirable for resolution, but the cost of producing an array with very narrow elements becomes a limiting factor. With present technology, an element width GD of about 6 micrometers produces suitable resolution. See FIG. 3B.

Length CD, or C'D', is the image plane length of the array elements 311, which affects the working range in the system. An element length of 1.8 millimeters, with the detector array at an angle of 45 degrees to the lens plane, using a lens of focal length 12.5 millimeters produces a working range of about 122 centimeters (48 inches).

The broad curve strip 313 represents a typical image of a scan through a bar code tag. The optical image is effectively sampled (divided) by the sensor array. This image 313 is the portion of the object 117 that is illuminated by the sheet of light from illumination section 113. Curved objects, objects positioned skewed to the optical axis of the lens or optical aberrations of the lens cause the image 313 to be curved or at an angle.

Each element 311 measures the amount of light reflected from the object that is imaged on that element. Each sensor element only "sees" a small area of the object. The size of the area determines the horizontal and vertical resolution of the optical system. Accordingly, the width of the sensor element, multiplied by the optical magnification, determines the horizontal resolution. The thickness of the illumination sheet determines the vertical resolution. Because of the shape and orientation of the elements 311 of the detector array 131, they are insensitive to the vertical position of the image. Since only the focused image of the illuminated strip reaches the detector array 131, reading curved or angled images is relatively easy.

The electrical output signal from an element 311 of detector array 131 is proportional to the intensity of light imaged on that element. A detector array with either serial or parallel output could be used, but to produce a typical scanner signal the parallel output must be converted to serial data using a parallel load shift register.

The signal processing electronics required for digitizing and decoding the detector array output signals from scanning a bar code tag are well known. CCD image sensors use a floating gate amplifier to convert the charge output signal to a voltage signal. MOS image sensors use a transimpedance amplifier to convert the output current signal to a voltage signal. The resulting voltage signal is amplified, and threshold detected to produce a digital signal whose high and low states correspond to the white and black portions of the bar code tag. Suitable electronics are similar to the circuits for bar code wands and scanners disclosed in U.S. Pat. No. 4,682,015, LOW POWERED HIGH AMBIENT LIGHT BAR CODE READER CIRCUIT, U.S. Pat. No. 4,740,675, DIGITAL BAR CODE SLOT READER WITH THRESHOLD COMPARISON OF THE DIFFERENTIATED BAR CODE SIGNAL, and U.S. Pat. No. 4,761,544, MEANS AND METHODS OF SCALING TIME INTERVAL MEASUREMENTS FROM AN OPTICAL BAR CODE SCANNER TO IMPROVE DECODER EFFICIENCY, for example.

Figure 4:
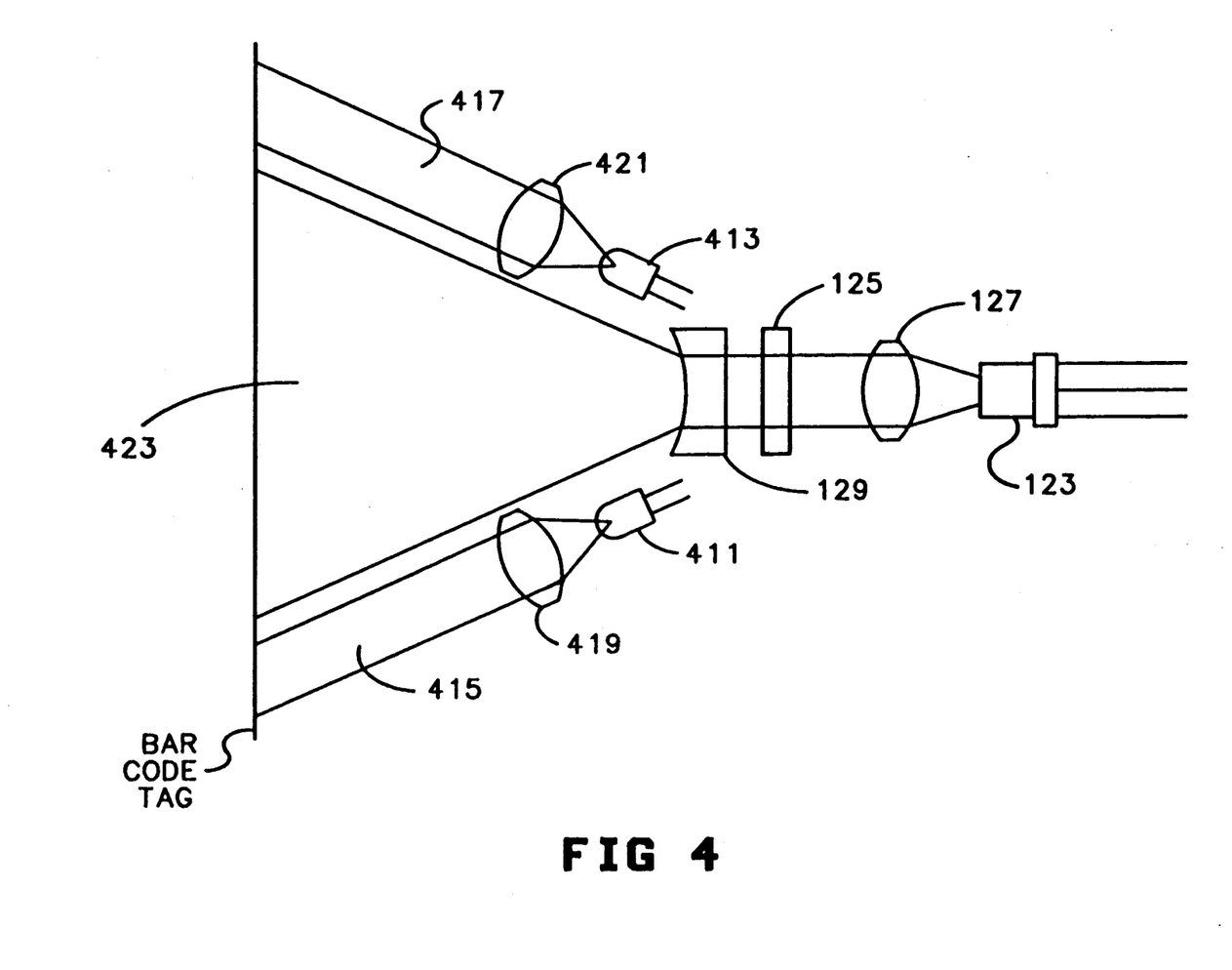
FIG. 4 is a schematic diagram of an aiming system for a scanner using an infrared illumination beam.

If the light source 123 produces infrared light, a line or spots of visible light projected onto the bar code tag can be used to provide an aiming pattern, indicating the actual area that will be optically scanned. FIG. 4 is a schematic diagram of an aiming system for a scanner using an infrared illumination beam. The illumination beam 423 is produced by light source 123, collimating lens 127, polarizing filter 125, and cylindrical lens 129. Two spots of visible light for aiming are projected by two light emitting diodes (LEDs) 411 and 413. LEDs 411 and 413 produce beams 415 and 417 of visible light through collimating lenses 419 and 421. Beams 415 and 417 are in the same plane as the sheet of light 423 produced by the light source 123, and the beams 415 and 417 are directed along the edges of the diverging sheet of light 423. The user points the scanner so the scanned area between the aiming spots from beams 415 and 417 includes the bar code tag.

If the light source 123 produces visible light, the illumination sheet can double as the aiming pattern. The user of the scanner would point the scanner so the scanned area illuminated by the sheet of light includes the bar code tag.

In an alternative embodiment, the detector array comprises only one sensor element. The illumination system is not required to be a sheet of light, but can be a spot beam, so the cylindrical lens 129 is not required. The illuminated spot on the object is imaged onto the sensor element. This system provides the same working range, but requires moving the illuminated spot with respect to the bar code tag, or moving the bar code tag with respect to the spot. This embodiment would be useful in a high depth of field bar code wand or a fixed beam non-contact scanner. Scanning could also be done by moving the sensor element and the illumination beam with respect to the lens.

The detector array 131 of the FIG. 1 embodiment has 5 elements with a tall aspect ratio, on the order of 300:1. An array with elements having a smaller aspect ratio could be used, if the imaging section optics included a cylindrical lens, or an equivalent anamorphic optical element, to condense the image of the working range onto the shorter sensor elements. An alternative for this type of system would be to move the sensor array along the Scheimpflug plane to create the desired working range. Elements with smaller areas are advantageous because the electrical noise generated is reduced, and smaller elements should be less expensive to fabricate.

It will be understood that a variety of optical focusing elements could be used in place of the simple lens in the embodiments described. The focusing function could be performed by, for example, lens arrays, a gradient index lens, a mirror, a fresnol zone plate, a fiber optic bundle or a holographic element.

It will also be understood that the optical system of the invention can be used in imaging systems for observing objects other than bar code tags. Although the system measures light reflected from an illuminated strip on an object, if the object moves in a direction perpendicular to the strip, the light reflected from an entire surface of the object can be measured. Compared with traditional imaging systems, the optical system of the invention has much more working range for a given resolution. For example, boxes with printed letters or numbers on them could move past a reader incorporating such an optical system. The system could collect data for an optical character reader to resolve these letters or numbers even though some boxes were of different sizes and thus at different distances from the optical system.

Another application of the invention is in page scanning machines such as facsimile machines and scanners used in desk top publishing. A facsimile machine measures the reflectance of a printed document along a line across the document, as the document is moved perpendicular to the line, thereby scanning the surface of the document. Current facsimile machines use simple optical imaging onto a photo sensor, with the depth of field limited by the f-number of the optical system. Page scanners use a similar optical system, with an element in the optical system being moved to provide scanning over the document. Employing the optical system and sensor of the invention would provide a larger depth of field, enabling scanning of materials, such as books or magazines, whose pages are not entirely flat.

Finally the invention could be employed in optical sensors, for example in metrology, production automation, or robot vision systems.

I claim:

1. An optical system for a bar code scanner for reading a bar code tag, comprising:
    a focusing means having an optical axis;
    illumination means for projecting a sheet of light along an object plane at a first acute angle with respect to a plane perpendicular to the optical axis of the focusing means, for illuminating a strip on the bar code tag to be read; and
    a detector array for receiving light reflected from the bar code tag, with a plurality of elements having a long axis and a short axis, positioned substantially in an image plane at a second acute angle with respect to a plane perpendicular to the optical axis of the focusing means, with the long axis of the elements arranged substantially perpendicular to the image of the illuminated strip of the bar code tag, the projection of the long axis of the elements of the detector array onto the object plane defining the working range of the optical system;
    a plane through the focusing means perpendicular to the optical axis of the focusing means, the image plane and the object plane all intersecting along a line so that an image of the illuminated strip of the bar code tag is formed substantially in focus on the detector array when the bar code tag is within the working range of the optical system.

2. The optical system of claim 1 wherein the illumination means comprises:
    a light source for producing a substantially planar sheet of light in a narrow frequency range;
    and the optical system further comprises:
    a bandpass filter positioned in the path of light reflected from the bar code tag to the detector, for passing substantially only light in the same frequency range as the light produced by the light source.

3. The optical system of claim 2 wherein the light source comprises:
    means for producing substantially collimated light; and
    beam spreading means for spreading the collimated light from the light source into a substantially planar sheet of light.

4. The optical system of claim 3 wherein the light source comprises a laser.

5. The optical system of claim 3 wherein the light source comprises a light emitting diode.

6. The optical system of claim 2 wherein the illumination means further comprises means for polarizing the light from the light source; and the optical system further comprises a polarizing filter, positioned in the path of light reflected from the bar code tag to the detector, with polarization oriented with respect to the polarization of the light from the light source so that transmission of light from specular reflections is minimized.

7. The optical system of claim 6 wherein the light source comprises a laser.

8. The optical system of claim 6 wherein the light source comprises a light emitting diode.

9. The optical system of claim 2 wherein the light source produces light having a frequency outside the visible frequency range, and the optical system further comprises:
    aiming means for projecting light at a visible frequency indicating the boundaries of the sheet of light from the illumination means.

10. The optical system of claim 9 wherein the light source comprises a laser and the aiming means comprises at least one light emitting diode.

11. The optical system of claim 9 wherein the light source comprises a laser and the aiming means comprises a laser producing visible light.

12. An optical system of a bar code scanner for reading a bar code tag, comprising:
    a focusing means having an optical axis;
    illumination means for projecting a beam of light along a line in an object plane at a first acute angle with respect to a plane perpendicular to the optical axis of the focusing means for illuminating a spot on the bar code tag to be read; and a detector for receiving light reflected from the bar code tag, comprising an element having a long axis and a short axis, with the long axis positioned substantially along the intersection of an image plane at a second acute angle with respect to a plane perpendicular to the optical axis of the focusing means and a plane including the optical centerline of the focusing means and the line along which the illumination means projects the beam of light, the projection of the detector onto the object plane defining the working range of the optical system;

a plane through the focusing means perpendicular to the optical axis of the focusing means, the image plane and the object plane all intersecting along a line so that the image of the illuminated spot on the bar code tag forms an image substantially in focus on the element when the bar code tag is within the working range of the optical system.

13. The optical system of claim 12 wherein the illumination means comprises:

a light source for producing substantially collimated light in a narrow frequency range;

and the optical system further comprises:

a bandpass filter positioned in the path of light reflected from the bar code tag to the detector, for passing substantially only light in the same frequency range as the light produced by the light source.

14. The optical system of claim 13 wherein the light source comprises a laser.

15. The optical system of claim 13 wherein the light source comprises a light emitting diode.

16. The optical system of claim 13 wherein the illumination means further comprises means for polarizing the light from the light source; and the optical system further comprises a polarizing filter, positioned in the path of light reflected from the bar code tag to the detector, with polarization oriented with respect to the polarization of the light from the light source so that transmission of light from specular reflections is minimized.

17. The optical system of claim 13 wherein the light source produces a light beam having a frequency outside the visible frequency range, and the optical system further comprises:

aiming means for projecting light at a visible frequency indicating the location of the light beam from the illumination means.

18. The optical system of claim 17 wherein the light source comprises a laser and the aiming means comprises at least one light emitting diode.

19. The optical system of claim 17 wherein the light source comprises a laser and the aiming means comprises a laser producing visible light.

20. An optical system for a bar code scanner for reading a bar code tag, comprising:

a focusing means including an anamorphic element and having an optical axis;

illumination means for projecting a sheet of light along an object plane at a first acute angle with respect to a plane perpendicular to the optical axis of the focusing means, for illuminating a strip on the bar code tag to be read; and a detector array for receiving light reflected from the bar code tag, with a plurality of elements positioned substantially in an image plane at a second acute angle with respect to a plane perpendicular to the optical axis of the focusing means, and arranged substantially perpendicular to the image of the illuminated strip of the bar code tag;

the anamorphic element positioned to expand the projection of the detector array in a direction perpendicular to the illuminated strip, the projection of the detector array onto the object plane defining the working range of the optical system;

a plane through the focusing means perpendicular to the optical axis of the focusing means, the image plane and the object plane all intersecting along a line so that an image of the illuminated strip of the bar code tag is formed substantially in focus on the detector array when the bar code tag is within the working range of the optical system.

21. An optical system for measuring light reflected from an object, comprising:

a focusing means having an optical axis;

illumination means for projecting a sheet of light along an object plane at a first acute angle with respect to a plane perpendicular to the optical axis of the focusing means, for illuminating a strip on the object; and a detector array for receiving light reflected from the object, with a plurality of elements having a long axis and a short axis, positioned substantially in an object plane at a second acute angle with respect to a plane perpendicular to the optical axis of the focusing means, with the long axis of the elements arranged substantially perpendicular to the image of the illuminated strip on the object, the projection of the long axis of the elements of the detector array onto the object plane defining the working range of the optical system;

a plane through the focusing means perpendicular to the optical axis of the focusing means, the image plane and the object plane all intersecting along a line so that an image of the illuminated strip on the object is formed substantially in focus on the detector array when the object is within the working range of the optical system.

22. The optical system of claim 21 wherein the illumination means comprises:

a light source for producing a substantially planar sheet of light in a narrow frequency range;

and the optical system further comprises:

a bandpass filter positioned in the path of light reflected from the object to the detector, for passing substantially only light in the same frequency range as the light produced by the light source.

23. The optical system of claim 22 wherein the light source comprises:

means for producing substantially collimated light; and beam spreading means for spreading the collimated light from the light source into a substantially planar sheet of light.

24. The optical system of claim 23 wherein the light source comprises a laser.

25. The optical system of claim 23 wherein the light source comprises a light emitting diode.

26. The optical system of claim 22 wherein the illumination means further comprises means for polarizing the light from the light source; and the optical system further comprises a polarizing filter, positioned in the path of light reflected from the object to the detector, with polarization oriented with respect to the polarization of the light from the light source so that transmission of light from specular reflections is minimized.

27. The optical system of claim 26 wherein the light source comprises a laser.

28. The optical system of claim 26 wherein the light source comprises a light emitting diode.

29. The optical system of claim 22 wherein the light source produces light having a frequency outside the visible frequency range, and the optical system further comprises:
aiming means for projecting light at a visible frequency indicating the boundaries of the sheet of light from the illumination means.

30. The optical system of claim 29 wherein the light source comprises a laser and the aiming means comprises at least one light emitting diode.

31. The optical system of claim 29 wherein the light source comprises a laser and the aiming means comprises a laser producing visible light.

32. An optical system for measuring light reflected from an object, comprising:
a focusing means having an optical axis;
illumination means for projecting a beam of light along a line in an object plane at a first acute angle with respect to a plane perpendicular to the optical axis of the focusing means for illuminating a spot on the object; and
a detector for receiving light reflected from the object, comprising an element having a long axis and a short axis, with the long axis positioned substantially along the intersection of an image plane at a second acute angle with respect to a plane perpendicular to the optical axis of the focusing means and a plane including the optical centerline of the focusing means and the line along which the illumination means projects the beam of light, the projection of the detector onto the object plane defining the working range of the optical system;
a plane through the focusing means perpendicular to the optical axis of the focusing means, the image plane and the object plane all intersecting along a line so that the image of the illuminated spot on the object forms an image substantially in focus on the element when the object is within the working range of the optical system.

33. The optical system of claim 32 wherein the illumination means comprises:
a light source for producing substantially collimated light in a narrow frequency range;
and the optical system further comprises:
a bandpass filter positioned in the path of light reflected from the object to the detector, for passing substantially only light in the same frequency range as the light produced by the light source.

34. The optical system of claim 33 wherein the light source comprises a laser.

35. The optical system of claim 33 wherein the light source comprises a light emitting diode.

36. The optical system of claim 33 wherein the illumination means further comprises means for polarizing the light from the light source; and the optical system further comprises a polarizing filter, positioned in the path of light reflected from the object to the detector, with polarization oriented with respect to the polarization of the light from the light source so that transmission of light from specular reflections is minimized.

37. The optical system of claim 33 wherein the light source produces a light beam having a frequency outside the visible frequency range, and the optical system further comprises:
aiming means for projecting light at a visible frequency indicating the location of the light beam from the illumination means.

38. The optical system of claim 37 wherein the light source comprises a laser and the aiming means comprises at least one light emitting diode.

39. The optical system of claim 37 wherein the light source comprises a laser and the aiming means comprises a laser producing visible light.

40. An optical system for measuring light reflected from an object, comprising:
a focusing means including an anamorphic element and having an optical axis;
illumination means for projecting a sheet of light along an object plane at a first acute angle with respect to a plane perpendicular to the optical axis of the focusing means, for illuminating a strip on the object to be read; and
a detector array for receiving light reflected from the object, with a plurality of elements positioned substantially in an image plane at a second acute angle with respect to a plane perpendicular to the optical axis of the focusing means, and arranged substantially perpendicular to the image of the illuminated strip of the object;
an anamorphic element positioned to expand the projection of the detector array in a direction perpendicular to the illuminated strip, the projection of the detector array onto the the object plane defining the working range of the optical system;
a plane through the focusing means perpendicular to the optical axis of the focusing means, the image plane and the object plane all intersecting along a line so that an image of the illuminated strip of the object is formed substantially in focus on the detector array when the object is within the working range of the optical system.

41. An optical system for a bar code scanner for reading a bar code tag comprising:
a focusing means having an optical axis;
a plurality of photodetectors, each having a long axis and a short axis lying in a plane at an acute angle with respect to a plane perpendicular to the optical axis of the focusing means, the photodetector plane and the focusing means plane intersecting along a line, the photodetectors being arranged side by side with the long axis of each photodetector being perpendicular to the line of intersection;
a source of illumination projecting light in an illumination plane at a second acute angle with respect to a plane perpendicular to the optical axis of the focusing means, the illumination plane intersecting the photodetector plane and the focusing means plane along the same line; and
means for spreading the light into a fan in the illumination plane.

42. An optical system for a bar code scanner for reading a bar code tag comprising:
a focusing means having an optical axis;
at least one photodetector having a long axis and a short axis lying in a plane at an acute angle with respect to a plane perpendicular to the optical axis of the focusing means, the photodetector plane and the focusing means plane intersecting along a line, the long axis of the photodetector being perpendicular to the line of intersection;

a source of illumination projecting light in an illumination plane at a second acute angle with respect to a plane perpendicular to the optical axis of the focusing means, the illumination plane intersecting the photodetector plane and the focusing means plane along the same line; and means for spreading the light into a fan in the illumination plane.

* * * * *